(12) United States Patent
Hori

(10) Patent No.: US 6,932,442 B2
(45) Date of Patent: Aug. 23, 2005

(54) ELASTIC-BODIED CRAWLER

(75) Inventor: Kazutoshi Hori, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 10/199,022

(22) Filed: Jul. 22, 2002

(65) Prior Publication Data

US 2003/0015918 A1 Jan. 23, 2003

(30) Foreign Application Priority Data

Jul. 23, 2001 (JP) ........................................ 2001-222131

(51) Int. Cl.[7] .............................................. B62D 55/24
(52) U.S. Cl. ...................... 305/171; 305/167; 305/179
(58) Field of Search ................................. 305/160, 165, 305/167, 169, 177, 178, 179, 170, 171

(56) References Cited

U.S. PATENT DOCUMENTS

| | | | | |
|---|---|---|---|---|
| 1,400,100 A | * | 12/1921 | Reddaway | ................. 305/184 |
| 2,476,460 A | * | 7/1949 | Smith | ..................... 305/179 |
| 2,494,065 A | * | 1/1950 | Slemmons | ................. 305/179 |
| 3,120,409 A | * | 2/1964 | Beall | ..................... 305/179 |
| 3,282,630 A | * | 11/1966 | Harrison et al. | |
| 3,477,767 A | * | 11/1969 | McNeil | |
| 3,747,995 A | * | 7/1973 | Russ, Sr. | |
| 3,900,231 A | * | 8/1975 | Ohm | ........................ 305/165 |
| 5,005,922 A | * | 4/1991 | Edwards et al. | ............ 305/184 |
| 5,352,029 A | * | 10/1994 | Nagorcka | .................... 305/179 |
| 5,632,537 A | * | 5/1997 | Yoshimura et al. | ......... 305/173 |
| 6,000,766 A | | 12/1999 | Takeuchi et al. | |
| 6,193,335 B1 | * | 2/2001 | Edwards | ..................... 305/167 |
| 6,536,852 B2 | | 3/2003 | Katayama et al. | |
| 2003/0019133 A1 | | 1/2003 | Hori | |

FOREIGN PATENT DOCUMENTS

| | | |
|---|---|---|
| JP | 4092785 | 3/1992 |
| JP | 11321731 | 11/1999 |

* cited by examiner

Primary Examiner—Russell D. Stormer
(74) Attorney, Agent, or Firm—Varndell & Varndell, PLLC (57) ABSTRACT

An elastic-bodied crawler, in which damages, such as local wear, coming-off of driven projections and the like in use, are prevented from being brought about, and frictional resistance is decreased at engaging portions to provide for durability, comprises a body with a reinforcement layer of reinforcement cables embedded therein circumferentially, driven projections provided in a predetermined pitch on an inner peripheral surface of the body, lug portions formed on an outer surface of the body, and reinforcement members (driven projection reinforcement cables) embedded to bridge the driven projections and the body.

18 Claims, 9 Drawing Sheets

ELASTIC-BODIED CRAWLER

BACKGROUND OF THE INVENTION

The invention mainly relates to an elastic-bodied crawler used for construction machines, such as crawler dump truck, hydraulic excavator and the like, and farm machines.

Figure 9A:
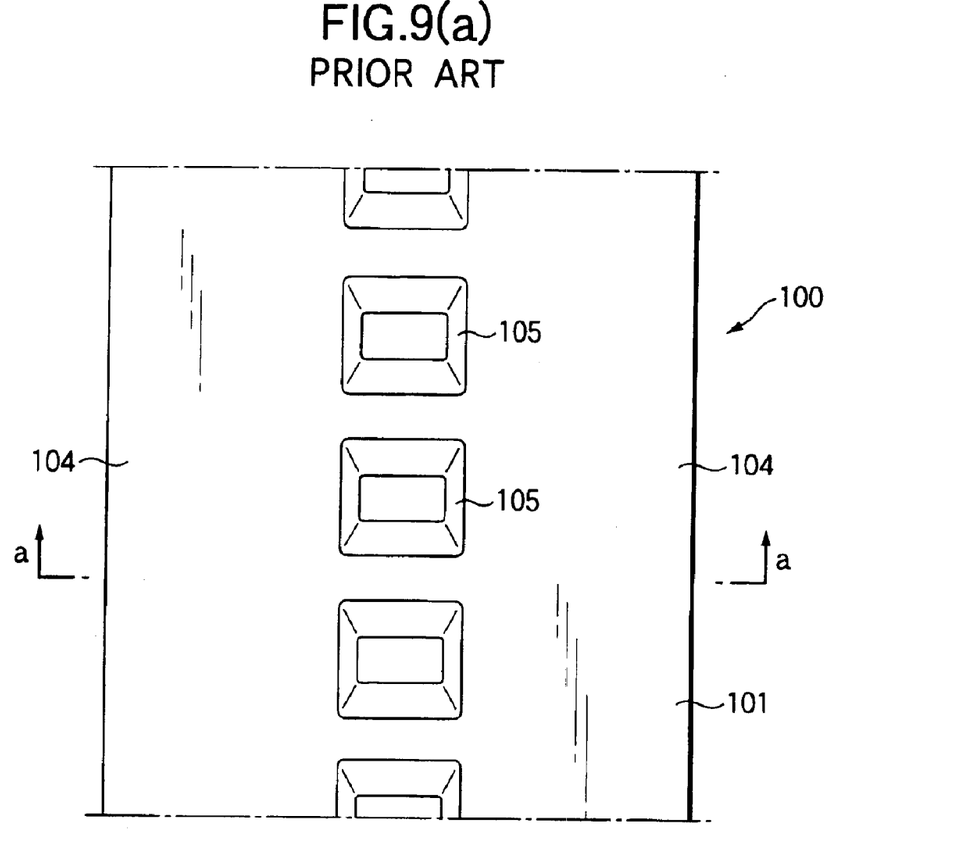
FIG. 9(a) is a top plan view showing a concrete example of a conventional elastic-bodied crawler without metal core members.
Figure 9B:
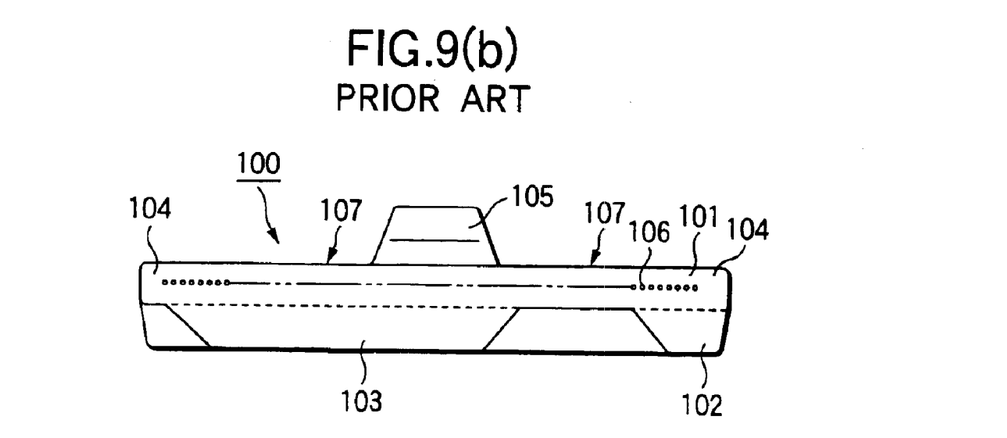

Conventionally, an endless elastic-bodied crawler formed by covering a plurality of metal core members with an organic elastic material (for example, rubber) has been frequently used in crawler vehicles such as construction machines and farm machines. In recent years, however, an elastic-bodied crawler without metal core members has been adopted in terms of recycling after use. FIG. 9(a) is a top plan view showing a concrete example of a conventional elastic-bodied crawler without metal core members and FIG. 9(b) is a cross sectional view taken along the line a—a. The conventional elastic-bodied crawler 100 without metal core members is formed integral as shown in FIGS. 9(a) and 9(b) to comprise driven projections 105, which are provided circumferentially at a predetermined pitch along a center line on an upper surface, and lug portions 102 having a lug 103 formed on an outer surface side (outer peripheral ground surface side) of an endless body 101 having a predetermined width and a predetermined thickness. The body 101 is structurally reinforced by arranging a multiplicity of reinforcement cables 106 near an inner surface of the body over an entire width of the body except ear portions 104 on both sides of the body and over an entire circumference of the body.

The elastic-bodied crawler 100 thus structured is wound around a sprocket and an idler in a traveling section of a crawler vehicle (not shown) to be able to transmit power in a state, in which the driven projections 105 provided on an inner surface of the elastic-bodied crawler 100 at a predetermined pitch engage with engaging teeth provided on a circumferential surface of the sprocket, and a multiplicity of rollers provided between the sprocket and the idler hold a ground surface side of the elastic-bodied crawler 100 from above to be able to ensure a ground force. In addition, the elastic-bodied crawler 100 is so structured that outer peripheral surfaces of the sprocket and the idler bear flat surfaces 107, 107 on both sides of the driven projections 105.

Figure 10:
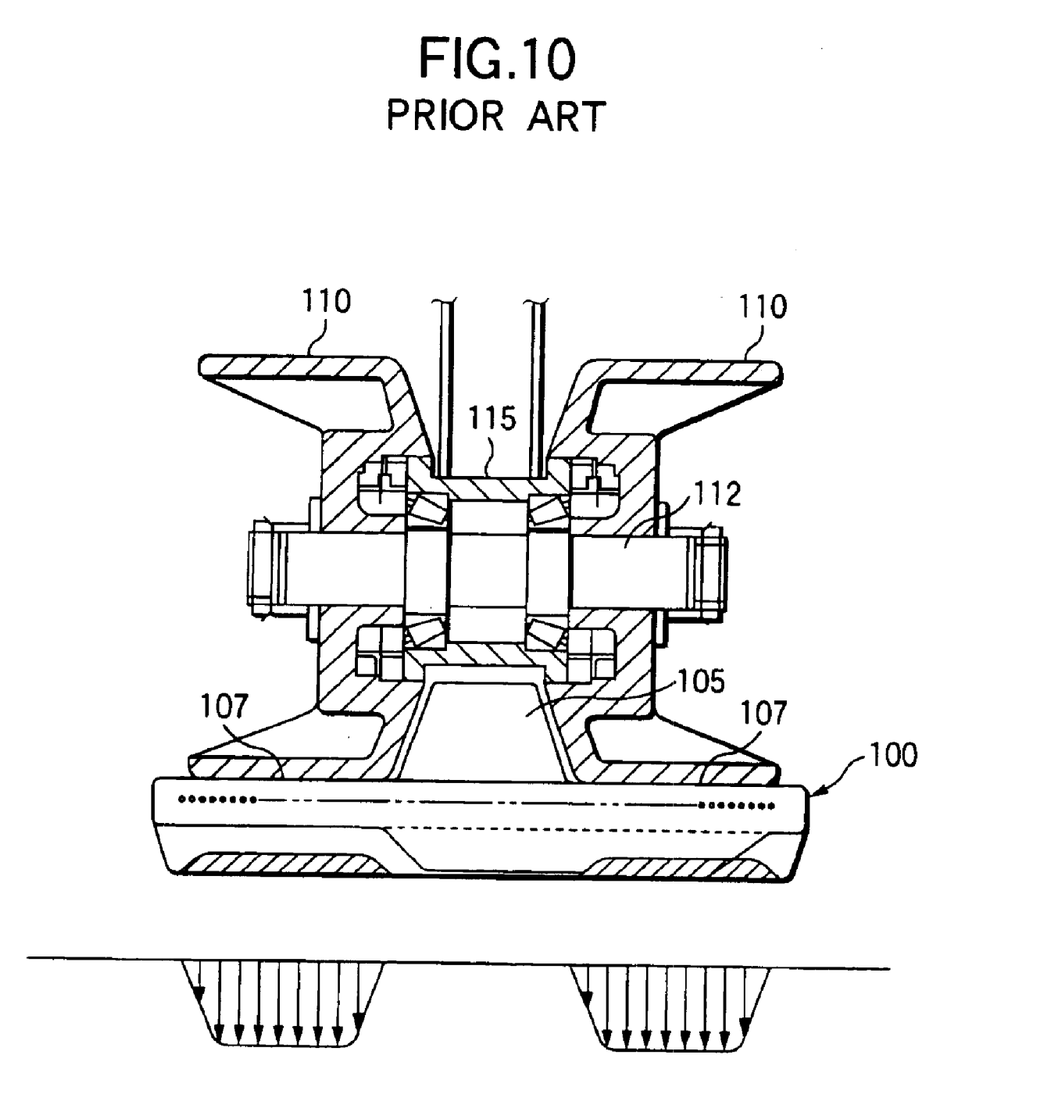
FIG. 10 is a view illustrating ground pressure distribution on portions of a conventional elastic-bodied crawler, which are pressed by rollers and a state, in which the elastic-bodied crawler is worn.

Also, with the elastic-bodied crawler 100, reaction forces during traveling are born by the plurality of rollers 110 provided for the purpose of ensuring a ground force during traveling and the flat surfaces 107, 107 on the both sides of the driven projections 105 provided along a center line on an inner surface of the body, as shown in FIG. 10. In addition, the rollers 110 are mounted on both side portions of a support shaft 112, an intermediate portion of which is rotatably born by a bearing 115 provided and supported on a traveling body frame (not shown), and provided in a manner to contact on both sides thereof with the flat surfaces 107, 107 and to bridge areas where the driven projections 105 are provided.

As described above, with the elastic-bodied crawler 100 wound around the traveling body, load from the rollers 110 is transmitted to a road surface immediately therebelow as it is. At this time, a ground pressure distribution is localized corresponding to projected surfaces of contact portions of the rollers 110, 110, as shown in FIG. 10. As a result, the lug portions 102 on the elastic-bodied crawler 100 undergo local wear, as shown in FIG. 10. When such local wear is generated, there is caused a problem that not only outward appearance is markedly damaged but also the elastic-bodied crawler is consequently shortened in service life because durability of the elastic-bodied crawler 100 is determined by those portions thereof, which are worn violently.

Also, the above elastic-bodied crawler is structured without metal core members such that the driven projections adapted to engage with the sprocket are formed simply from an elastic material (for example, rubber) that constitutes the elastic-bodied crawler. Accordingly, there can be caused an accident that the driven projections come off under the influence of local load due to engagement thereof with engaging teeth on the sprocket in a frequent running drive. When the driven projections come off, there is caused a problem that smooth driving becomes naturally difficult and coming-off portion or portions cannot be repaired for the structural reason of the elastic-bodied crawler, so that it is necessary in this situation to replace the entire elastic-bodied crawler even if a damage portion or portions are limited. Further, there is caused a problem that when the driven projections engage with the sprocket, frictional resistance is increased at locations where contact pressure with a constituent member (elastic material such as rubber) becomes elevated, which is responsible for deterioration and unfavorable generation of sound of abrasion.

The invention has been thought of in order to solve such problems, and has its object to provide an elastic-bodied crawler, in which damages, such as local wear, coming-off of driven projections and the like in use, are prevented from being brought about, and frictional resistance is decreased at engaging portions to provide for durability.

SUMMARY OF THE INVENTION

To attain the above object, the invention provides an elastic bodied crawler comprising a body with reinforcement cables embedded therein circumferentially, driven projections provided on an inner peripheral surface of the body, lug portions provided on an outer surface of the body, and reinforcement members embedded to strengthen the driven projections and the body.

According to the invention, the reinforcement members are embedded to strengthen the driven projections and the body whereby the driven projections provided projectingly on one surface of the body are relatively reinforced internally by the body reinforced by the reinforcement cables, so that the same function as that in the case where metal core members are housed is fulfilled and ground pressure on the lug portions on the ground surface side in use acts in a state of uniform distribution without acting as local load. Accordingly, wear of the lug portions is equalized to endure long-term use, that is, durability can be enhanced. Also, the driven projections are reinforced and so coming-off thereof is eliminated.

The reinforcement members are preferably embedded in a manner to strengthen the driven projections and the lug-side portion of the body (second invention). With such arrangement, the reinforcement members are positioned between interiors of the driven projections and the body to bridge layers of the reinforcement cables arranged in the body and put in a state, in which they are connected to the layers of the reinforcement cables, thus giving an effect that both reinforce each other to be able to counter traction forces acting on the driven projections, to endure damages such as breakage, coming off or the like and to propagate ground pressure to an entire width of the lug portions prevent local wear. Accordingly, there is given an effect that it is possible to enhance durability and to eliminate lack of economy such as replacement of the elastic-bodied crawler required because of partial damage.

The respective reinforcement members are preferably embedded in the vicinity of portions of the driven projections, which engage with teeth of a sprocket (third invention). With such arrangement, even when sand and pebbles entering from outside may bite into engaging portions between the driven projections and teeth of the sprocket, damages caused thereby can be prevented by the reinforcement members. Also, it is possible to prevent generation of abnormal noise caused by frictional resistance upon engagement with the teeth of the sprocket. In particular, when the reinforcement members are embedded in the root portions of the drive projections in a manner to be exposed to those engaging portions, which engage with the teeth of the sprocket, it is possible to decrease frictional resistance at such portions to thereby reduce generation of abnormal noise caused by engagement with the teeth.

It is preferable that steel cable, resin fiber cable, canvas or plastic plates or a combination thereof be used for the reinforcement members (fourth invention). A material suited to be embedded between the body of the elastic-bodied crawler and the driven projections or in the root portions of the driven projections in a state of being bent and formed to be conformed to a corresponding arrangement and configuration is selected and used as the reinforcement members, and steel cable or resin fiber cable among the above materials is used to be made favorable in adherence to an elastic material, which forms the elastic-bodied crawler, thus enabling enhancing the reinforcing function. Also, in the case of using canvas, the surface-reinforcing function produced by weaving thereof can be made use of to provide a local reinforcing effect. Also, when plastic plates of favorable workability are used, they can be formed in optional shape and embedded in essential positions taking account of a quality bonding to an elastic material at the time of forming, whereby the reinforcing effect can be increased.

A fifth invention provides an elastic-bodied crawler comprising a body with reinforcement cables embedded therein circumferentially, driven projections provided on an inner peripheral surface of the body, lug portions provided on an outer surface of the body, and reinforcement members formed by canvas embedded on a surface or near the surface to strengthen the driven projections and the body. According to the invention, a weaving structure of canvas is made use of to be able to easily enhance a tensile strength against local external forces. Accordingly, there is given an effect that it is possible to prevent generation of damages such as coming-off of driven projections and to enhance durability of an elastic-bodied crawler.

It is preferable that canvas pieces as the reinforcement members be embedded in the vicinity of those portions of the driven projections, which engage with teeth of a sprocket in the fifth invention (sixth invention). When canvas pieces as the reinforcement members are embedded in the portions of the driven projections in an exposed state, there is given an effect that they can decrease frictional resistance at the time of engagement with the teeth of the sprocket, and it is possible to prevent deterioration of an elastic material caused by generation of heat, suppress generation of abnormal noise such as sound of abrasion, and reduce drive resistance.

BRIEF DESCRIPTION OF THE DRAWINGS

9(b) is a cross sectional view taken along the line a—a in FIG. 9(a); and

DETAILED DESCRIPTION OF THE PREFERRED EMBODIMENTS

An explanation will be given below to concrete embodiments of an elastic-bodied crawler according to the invention with reference to the drawings.

Figure 1:
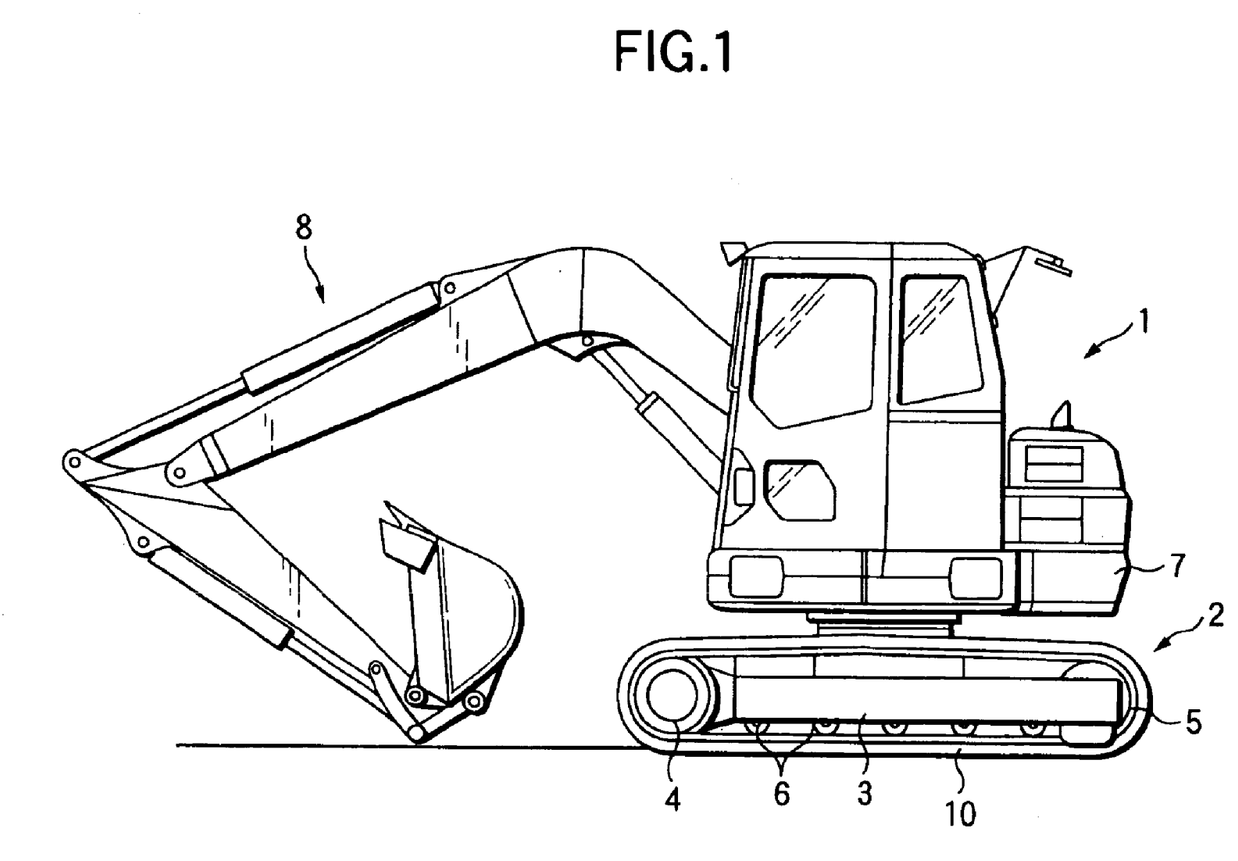
FIG. 1 is a view showing a hydraulic excavator with elastic-bodied crawlers, according to the invention, wound around a lower running body.
Figure 2:
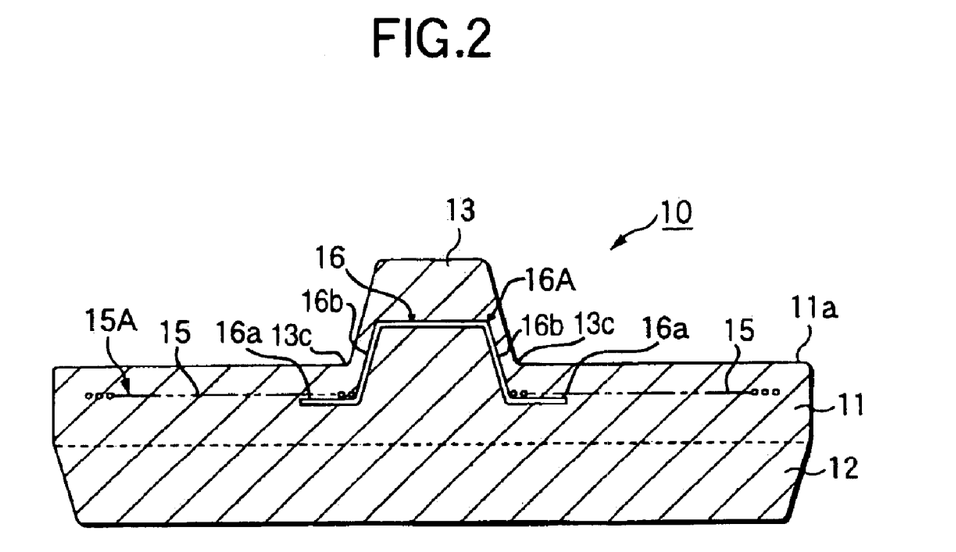
FIG. 2 is a transverse cross section showing the elastic-bodied crawler according to a first embodiment.
Figure 3:
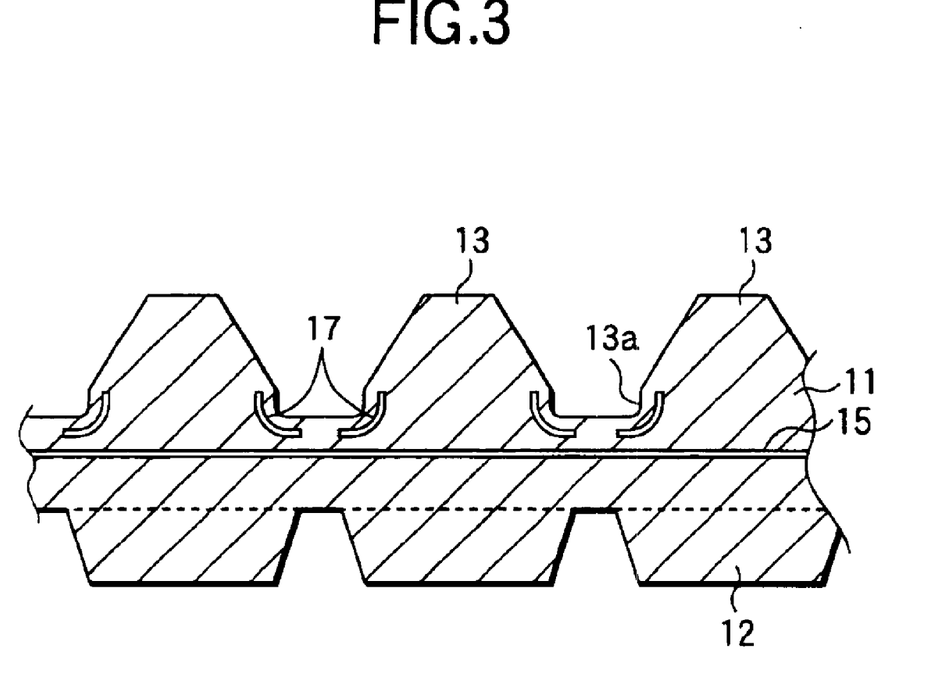
FIG. 3 is a longitudinal, cross sectional view showing a part of the elastic-bodied crawler.
Figure 4A:
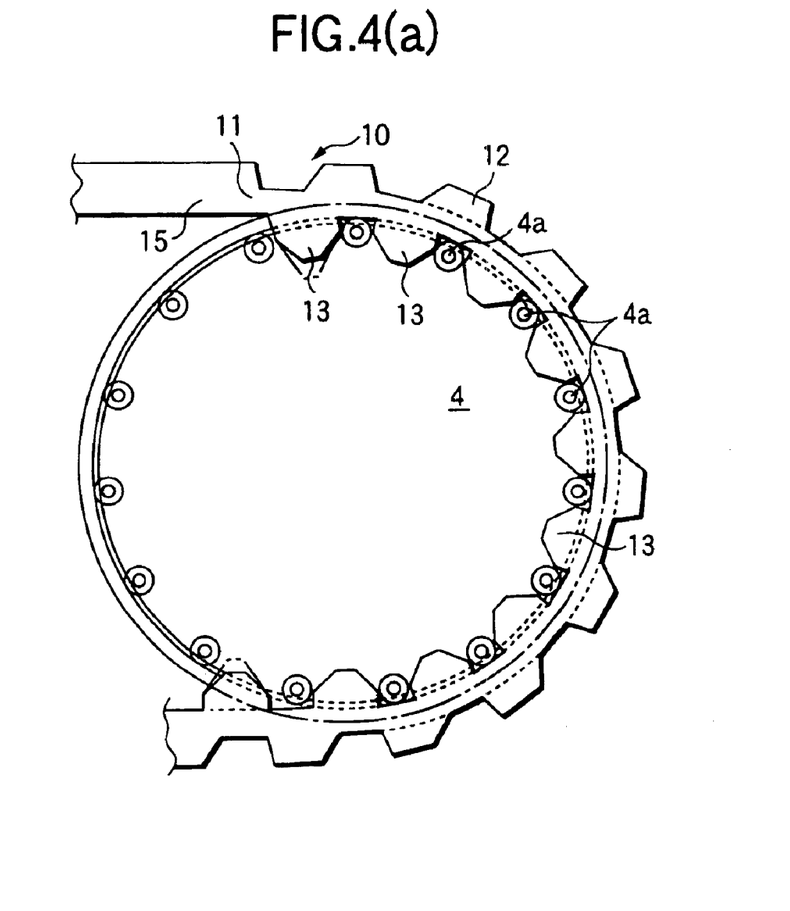
FIG. 4(a) is a view showing a manner, in which a sprocket and driven projections of the elastic-bodied crawler engage with each other.
Figure 4B:
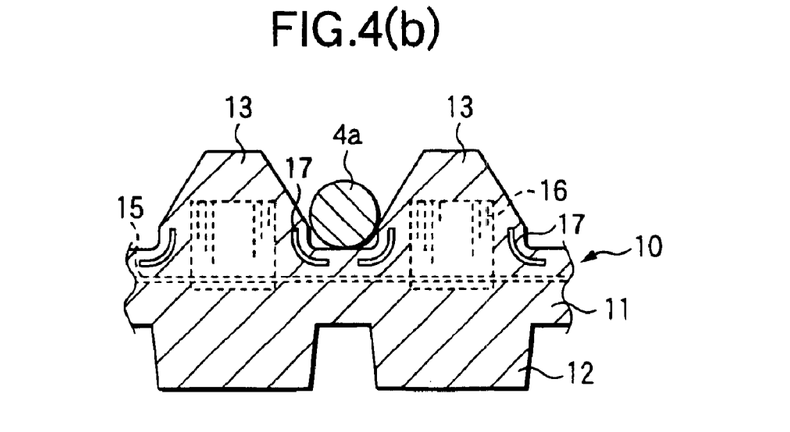
FIG. 4(b) is an enlarged cross sectional view showing engaging portions.

FIG. 1 is a view showing a hydraulic excavator with elastic-bodied crawlers according to the invention, wound around a lower running body, and FIG. 2 shows a cross section of an elastic-bodied crawler according to a first embodiment. FIG. 3 is a longitudinal, cross sectional view showing an elastic-bodied crawler according to a second embodiment, and FIG. 4A is a view showing a manner, in which a sprocket and driven projections of an elastic-bodied crawler engage with each other, FIG. 4B being an enlarged cross sectional view showing engaging portions.

An elastic-bodied crawler 10 according to the embodiment is wound around a sprocket 4 and an idler 5, as shown in FIG. 1, which are arranged on front and rear ends of a track frame 3 on a lower running body 2 of a crawler vehicle, for example, a hydraulic excavator 1, and a plurality of rollers 6 supported by shafts, which are rotatably borne by bearings of brackets mounted on the track frame 3, press the lug portions on the crawler against the ground surface. In addition, the reference numeral 7 denotes an upper revolving body, and 8 a working implement provided with a bucket.

The elastic-bodied crawler 10 according to the first embodiment comprises, likewise the prior art with respect to an external appearance, driven projections 13 provided in a predetermined pitch on an inner peripheral surface 11a of an endless body 11, which is formed from an elastic material (for example, rubber) to have a predetermined dimension, and lug portions 12 provided on an outer peripheral surface of the body to form a lug of a predetermined shape. As shown in FIG. 2, a multiplicity of reinforcement cables (main cables 15 (steel cables or cables of resin fiber)) are arranged and embedded circumferentially in positions near the inner peripheral surface 11a of the body 11 except a position immediately below the driven projections 13.

In the multiplicity of driven projections 13 provided in a predetermined pitch on an inner peripheral surface 11a of the body 11, driven projection reinforcement members (driven projection reinforcement cables 16) formed in a hat-shape by bending a plurality of cables as shown in FIG. 2 that are arranged and embedded in the body 11 to strengthen the driven projections 13. As shown in FIG. 2, ends (or second legs) 16a thereof are positioned in the lug-side portion of the body toward the lug portions 12 crossing a layer of main cables 15, and first legs 16b thereof are parallel to the sides of the driven projections 13. A side 13b of the driven projections is identified in FIG. 5. As shown in FIG. 2, the body and the sides of the driven projections define a plurality of corners 13c, and the projection reinforcement members 16 are adjacent the corners 13c. In addition, the driven projection reinforcement cables 16 are arranged in ranges, in which the cables are not exposed outside, in accordance with the shape of the driven projections 13.

Also, root reinforcement members 17 formed from canvas pieces cut to a predetermined width having a length within a width of the driven projections 13 are bent arcuately and embedded in those root portions of the respective driven projections 13, which constitute engaging portions 13a adapted to engage with drive pins 4(a) (corresponding to teeth of the sprocket according to the invention) (see FIG. 4(a)) of the sprocket 4 to be disposed near the inner peripheral surface 11a of the body 11 as shown in FIG. 3.

Since the multiplicity of driven projection reinforcement cables 16 bent in a hat-shape and embedded in the respective driven projections 13 to form a layered shape are incorporated in a manner to have ends 16A, 16A thereof bridging the body relative to the layers 15A of the main cables 15 embedded in the body 11 for reinforcement, the elastic-bodied crawler 10 structured in the above manner provides such a reinforced structure that the layers 15A of the main cables 15 and reinforcement layers 16A of the respective driven projection reinforcement cables 16 are formed integral by the elastic material and the two layers 15A, 15A arranged circumferentially and clear of a central portion are coupled together by the reinforcement layers 16A while a three-dimensional configuration is preserved. Accordingly, a whole strength is increased, so that in particular, the reinforcement layers 16A in the driven projections 13 cooperate with the layers 15A in the body 11 to be able to counter external forces and to prevent coming-off due to, for example, bite of rock or the like, and when load pressures applied by rollers act toward a ground surface, ground pressure is distributed uniformly over an entire width of the lug portions 12 whereby local wear of the lug due to local load is eliminated.

Also, when the driven projections 13 engage with the drive pins 4(a), the root reinforcement members 17 are embedded in the root portions on the engaging portions 13a of the respective driven projections 13, so that even when an intense load is repeatedly applied by the drive pins 4a upon driving, the driven projections 13 are internally reinforced by the root reinforcement members 17 to exhibit a tensile strength equal to or more than a pressure-resistant strength of only an elastic material, which constitutes the driven projections 13 to be able to precisely transmit drive forces without being deformed and broken or coming off.

In this manner, according to the present embodiment, the driven projections 13 are integrally reinforced by the body 11 and the reinforcement members to be able to enhance the entire crawler, perform a stable driving and enhance durability. Besides, there is an advantage that at the time of disposal after use, cutting disposal can be simply made because of non-existence of metal core members and recycling operation is facilitated.

Figure 5:
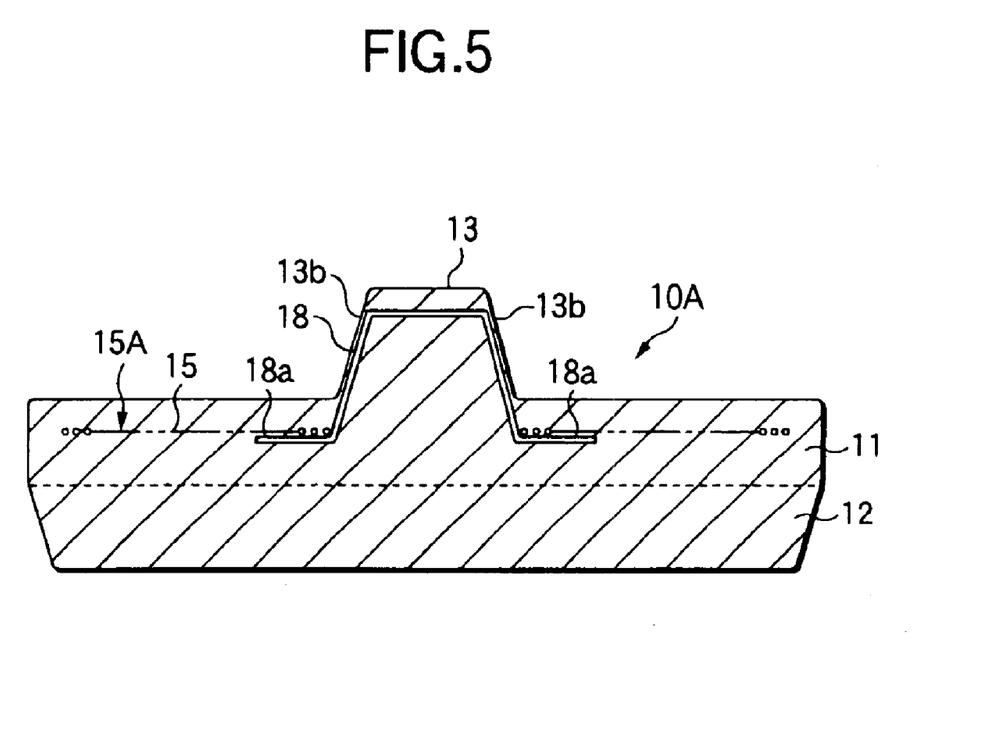
FIG. 5 is a cross sectional view showing an elastic-bodied crawler according to a second embodiment.

FIG. 5 is a cross sectional view showing an elastic-bodied crawler according to a second embodiment. An elastic-bodied crawler 10A is the same in whole external appearance as that in the first embodiment, but is different therefrom partly in the structure of assembling of reinforcement members. Accordingly, the same reference numerals denote the same elements as those in the above embodiment, and a detailed explanation therefor is omitted.

Driven projection reinforcement members 18 embedded in the driven projections and formed in a hat-shape and in a layered manner in the same manner as in the first embodiment by bending a multiplicity of cables in a manner to approximate the same to an outside surface of the driven projection 13 in a widthwise direction thereof are incorporated in the driven projections 13 provided projectingly on an inner peripheral surface 11a of the body 11 such that ends 18a, 18a of the members passed under layers 15A formed by main cables 15, which are arranged in the body 11, on a side toward the lug portions 12.

With the elastic-bodied crawler 10A provided with the driven projections 13 structured in this manner, in which the driven projection reinforcement members 18 are embedded, the driven projection reinforcement members 18 embedded in the driven projections 13 are arranged in a state exposed to surfaces of both side portions 13b, 13b in a widthwise direction or in a state approximating the above state whereby frictional resistance caused upon contact with the sprocket at the engaging portion thereof is decreased as compared with that upon contact of a conventional elastic material (rubber) with groove sides of the sprocket, thus enabling reducing generation of heat accompanied by friction. Also, it is possible to eliminate sound of abrasion. Further, there is given an effect that frictional resistance caused upon contact with the sprocket can be decreased, and the crawler can be held even when rock enters from outside to bite thereinto. Of course, enhancement of the entire crawler in strength is the same as that in the first embodiment.

Figure 6A:
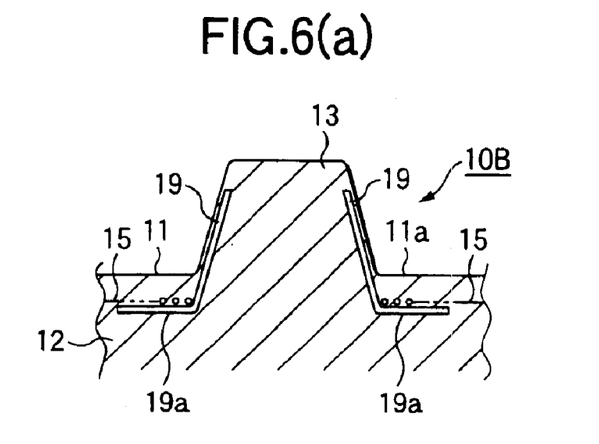
FIG. 6(a) is a transverse cross sectional view showing a driven projection in an elastic-bodied crawler according to a third embodiment.
Figure 6B:
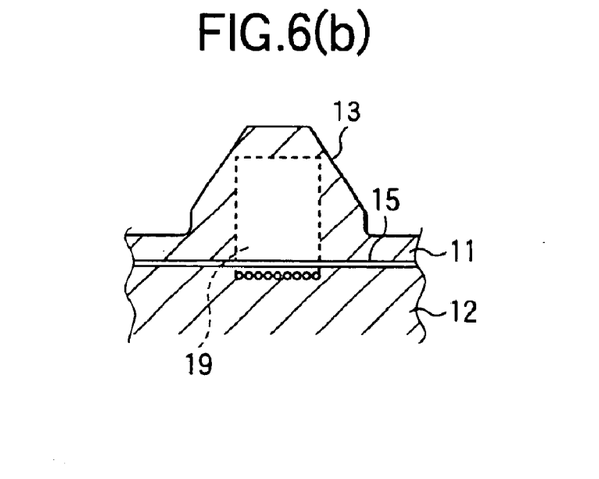
FIG. 6(b) is a longitudinal cross sectional view showing the driven projection.

Also, FIG. 6(a) is a transverse cross sectional view showing a driven projection in an elastic-bodied crawler according to a third embodiment, and FIG. 6(b) is a longitudinal cross sectional view. An elastic-bodied crawler 10B is the same in whole external appearance as that in the first embodiment, but is different therefrom partly in the structure of assembling of reinforcement members in driven projections 13. Accordingly, the same reference numerals denote the same elements as those in the above embodiment, and a detailed explanation therefor is omitted Driven projection reinforcement members 19 embedded in driven projections 13 provided projectingly on an inner peripheral surface 11a of the body 11 are constructed such that separate configurations each having an upper half adjacent to both sides of the driven projection 13 in a widthwise direction and a lower end 19(a) bent in a manner to extend along the layer 15A of the main cables 15 provided in the body 11 on a side toward the lug portions 12 are arranged in a left-right symmetric manner. Such structure is the same in function and effect as that in the above-mentioned embodiments. In addition, canvas pieces of a predetermined dimension may be bent and embedded to form the driven projection reinforcement members 19, as desired. Also, plastic plates can be bent and used. In the case of using such plastic plates and canvas pieces, it is preferable to provide therein a plurality of through holes partly in order to ensure embedding.

Figure 7:
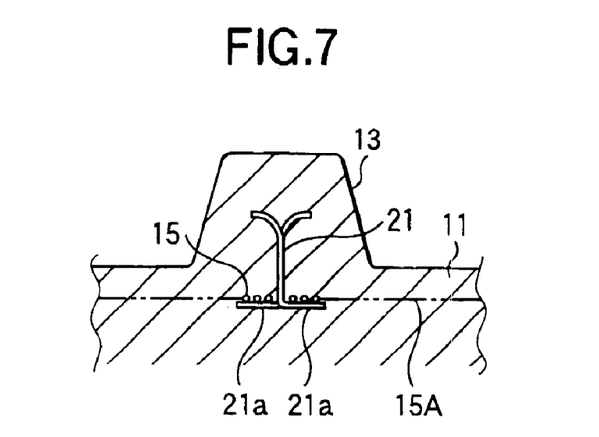
FIG. 7 is a cross sectional view showing a driven projection in an endless elastic-bodied crawler according to a fourth embodiment.

FIG. 7 is a cross sectional view showing a driven projection in an endless elastic-bodied crawler according to a fourth embodiment. An endless elastic-bodied crawler according to this embodiment is formed to be the same in external appearance as the above embodiments, and main cables 15 embedded in the body 11 are arranged and extended below the driven projection 13 (in the figure) to form a reinforcement layer 15A of the main cables 15 over a substantially entire width. Meanwhile, driven projection reinforcement members 21 embedded in the driven projection 13 are constructed such that a multiplicity of elastic members are embedded to have lower ends 21a thereof bent to strengthen the reinforcement layer 15A of the main cables 15 and extend on a side of lug portions and to have tip ends (upper ends) of upright portions thereof bent right and left and arranged centrally of the driven projection 13 in a layered manner.

With such structure, it is possible to arrange reinforcement members in the driven projection 13, to arrange the reinforcement layer 15A of the main cables 15 in positions immediately below the driven projections, to provide for reinforcement on the entire endless elastic-bodied crawler, and to further enhance strength. In addition, with this embodiment, plastic moldings can be used for the driven projection reinforcement members 21, which contributes to improvement in workability in manufacture.

Figure 8:
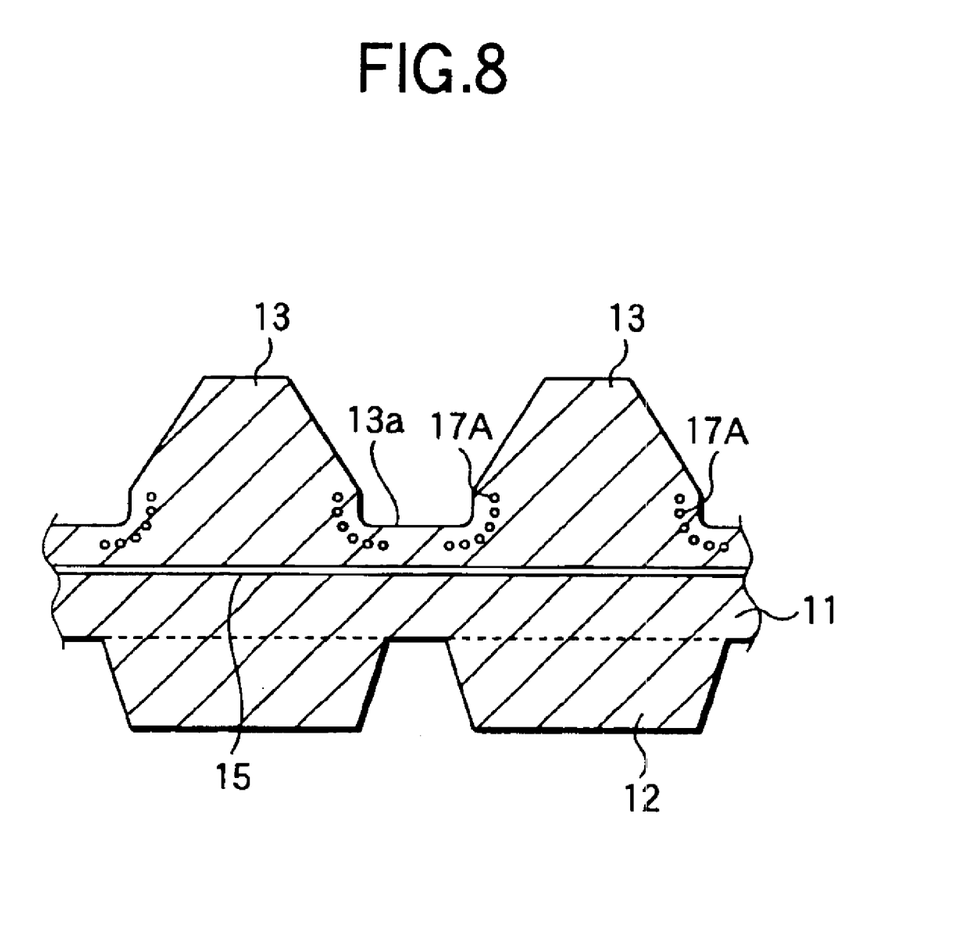
FIG. 8 is a view showing a root reinforcement on driven projections according to a further embodiment.

Also, when root reinforcement members 17A are arranged in the root portions on those engaging portions 13a of the driven projections 13, which engage with the drive pins 4a of the sprocket 4, as shown in FIG. 8, a multiplicity of cables are arranged to be conformed to a shape of the root portions, and preferably embedded in a manner to have a part of the cables exposed. With such structure, upon engagement with the drive pins of the sprocket the root reinforcement members 17A come into contact with the drive pins with a reduced frictional resistance as compared with the case where an elastic material come into contact with the drive pins, whereby it is possible to suppress heat generated by friction at the time of driving and prevent generation of sound of abrasion. In addition, in the case where canvas pieces are used as the root reinforcement members 17A, it is preferable that a part thereof be exposed.

In the above embodiments, it is preferable that synthetic fiber yarns such as nylon fibers be used for canvas as reinforcement members by virtue of durability. Also, it is preferable to use plastics of high mechanical strength.

What is claimed is:

1. An endless elastic-bodied crawler belt comprising:
    a body with reinforcement cables embedded therein and extending in a circumferential direction of the belt,
    a plurality of driven projections arranged in the circumferential direction of the belt and provided on an inner surface of the body the driven projections respectively having a front and back crossing the circumferential direction of the belt, a top joining upper ends of the front and back, and sides parallel to the circumferential direction of the belt,
    lug portions provided on an outer surface of the body, and projection reinforcement members respectively embedded in the driven projections and the body and extending beyond the sides of the driven projections, the projection reinforcement members respectively arranged adjacent the sides of the driven projections and extending across a depth of the driven projections in the circumferential direction of the belt in an amount at least equal to a depth of the top of the driven projections.

2. The elastic-bodied crawler belt according to claim 1, wherein the projection reinforcement members respectively extend from within the lugs to beyond the reinforcement cables in the body, and then along a surface of the reinforcement cables of the body.

3. The elastic-bodied crawler belt according to claim 2, wherein the body and the sides of the driven projections define a plurality of corners, and the projection reinforcement members are adjacent the corners.

4. The elastic-bodied crawler belt according to claim 3, wherein the projection reinforcement members are formed from canvas or cables.

5. The elastic-bodied crawler belt according to claim 1, wherein the projection reinforcement members including first legs and second legs joined together, the first legs being respectively arranged parallel to side surfaces of the driven projections relative to the circumferential direction of the belt, the first legs extending across the reinforcement cables, and the second legs being respectively arranged parallel to the inner surface of the body and below the reinforcement cables relative to the inner surface of the body.

6. The elastic-bodied crawler belt according to claim 5, wherein the root reinforcement members are made from canvas.

7. The elastic-bodied crawler belt according to claim 5, wherein the projection reinforcement members respectively have five sides, three sides of the five sides are parallel to corresponding a top surface and the side surfaces of the driven projections, and two sides of the five sides are parallel to the inner surface of the body.

8. An endless elastic-bodied crawler belt comprising a body with reinforcement cables embedded therein and extending in a circumferential direction of the belt, a plurality of driven projections arranged in the circumferential direction of the belt and provided on an inner surface of the body, lug portions provided on an outer surface of the body, the body and the driven projections defining a plurality of corners in front of and behind the driven projections relative to the circumferential direction of the belt that sequentially engage teeth of a sprocket, and root reinforcement members embedded in the driven projections and the body in areas adjacent the corners and extending between the driven projections and the body.

9. The elastic-bodied crawler belt according to claim 8, wherein the root reinforcement members respectively follow a contour of the corners.

10. The elastic-bodied crawler belt according to claim 9, wherein the root reinforcement members are formed from canvas or cables.

11. An endless elastic-bodied crawler belt comprising a body with reinforcement cables embedded therein and extending in a circumferential direction of the belt, driven projections provided on an inner surface of the body, lug portions provided on an outer surface of the body, and projection reinforcement members embedded in the driven projections and the body, the projection reinforcement members including first legs and second legs joined together, the first legs being respectively arranged parallel to side surfaces of the driven projections relative to the circumferential direction of the belt, the first legs extending across the reinforcement cables, and the second legs being respectively arranged parallel to the inner surface of the body and below the reinforcement cables relative to the inner surface of the body.

12. The elastic-bodied crawler belt according to claim 11, wherein the projection reinforcement members respectively have five sides, three sides of the five sides are parallel to a corresponding top surface and the side surfaces of the driven projections, and two sides of the five sides are parallel to the inner surface of the body.

13. An endless elastic-bodied crawler belt comprising:
- a body with reinforcement cables embedded therein and extending in a circumferential direction of the belt,
- a plurality of driven projections arranged in the circumferential direction of the belt and provided on an inner surface of the body, the driven projections respectively having left and right sides parallel to the circumferential direction of the belt,
- lug portions provided on an outer surface of the body, and
- projection reinforcement members respectively embedded in the driven projections and the body and extending beyond the sides of the driven projections, the projection reinforcement members respectively arranged adjacent and following a contour of the left and right sides of the driven projections.

14. The elastic-bodied crawler belt according to claim 13, wherein the projection-reinforcement members respectively extend from within the lugs to beyond the reinforcement cables in the body, and then along a surface of the reinforcement cables of the body.

15. The elastic-bodied crawler belt according to claim 14, wherein the body and the sides of the driven projections define a plurality of corners, and the projection reinforcement members are adjacent the corners.

16. The elastic-bodied crawler belt according to claim 15, wherein the projection reinforcement members are formed from canvas or cables.

17. The elastic-bodied crawler belt according to claim 13, wherein the projection reinforcement members including first legs and second legs joined together, the first legs being respectively arranged parallel to side surfaces of the driven projections relative to the circumferential direction of the belt, the first legs extending across the reinforcement cables, and the second legs being respectively arranged parallel to the inner surface of the body and below the reinforcement cables relative to the inner surface of the body.

18. The elastic-bodied crawler belt according to claim 13, wherein the root reinforcement members are made from canvas and the projection reinforcement members are made from cables.

* * * * *